US008781253B2

(12) United States Patent
Bhaskaranand et al.

(10) Patent No.: US 8,781,253 B2
(45) Date of Patent: Jul. 15, 2014

(54) METHOD AND APPARATUS FOR VIDEO OBJECT SEGMENTATION

(75) Inventors: Malavika Bhaskaranand, Goleta, CA (US); Sitaram Bhagavathy, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/522,589

(22) PCT Filed: Jan. 20, 2011

(86) PCT No.: PCT/US2011/000106
§ 371 (c)(1),
(2), (4) Date: Jul. 17, 2012

(87) PCT Pub. No.: WO2011/090789
PCT Pub. Date: Jul. 28, 2011

(65) Prior Publication Data
US 2012/0294530 A1 Nov. 22, 2012

Related U.S. Application Data

(60) Provisional application No. 61/336,517, filed on Jan. 22, 2010.

(51) Int. Cl.
*G06K 9/20* (2006.01)
*G06T 7/20* (2006.01)

(52) U.S. Cl.
CPC ..... *G06T 7/2053* (2013.01); *G06T 2207/20144* (2013.01); *G06T 2207/10016* (2013.01)
USPC ............ 382/283; 382/173; 382/171; 382/190

(58) Field of Classification Search
USPC ......... 382/162, 164, 103, 173, 171, 190, 283, 382/243; 358/464; 345/626; 348/169, 348/403.1; 725/45; 375/240.03, 240.24
See application file for complete search history.

(56) References Cited

U.S. PATENT DOCUMENTS

| 7,639,878 | B2 * | 12/2009 | Ibrahim et al. | 382/190 |
| 8,422,775 | B2 * | 4/2013 | Wang et al. | 382/164 |
| 8,457,401 | B2 * | 6/2013 | Lipton et al. | 382/173 |
| 8,520,975 | B2 * | 8/2013 | Wang et al. | 382/283 |

OTHER PUBLICATIONS

Malavika et al., "Motion-based Object Segmention using Frame Alignment and Consensus Filtering," 17th IEEE International Conference on Image Processing (ICIP), 2010, Sep. 26, 2010, pp. 2245-2248.

Chien et al., "Efficient Moving Object Segmentation Algorithm using Background Registration Technique," IEEE Transactions on Circuits and Systems for Video Technology, vol. 12, No. 7 Jul. 1, 2002.

(Continued)

*Primary Examiner* — Anh Do
(74) *Attorney, Agent, or Firm* — Ronald J. Kolczynski; Robert D. Shedd

(57) ABSTRACT

Methods and apparatus for video object segmentation are provided, suitable for use in a super-resolution system. The method comprises alignment of frames of a video sequence, pixel alignment to generate initial foreground masks using a similarity metric, consensus filtering to generate an intermediate foreground mask, and refinement of the mask using spatio-temporal information from the video sequence. In various embodiments, the similarity metric is computed using a sum of squared differences approach, a correlation, or a modified normalized correlation metric. Soft thresholding of the similarity metric is also used in one embodiment of the present principles. Weighting factors are also applied to certain critical frames in the consensus filtering stage in one embodiment using the present principles.

9 Claims, 3 Drawing Sheets

(56) References Cited

OTHER PUBLICATIONS

Radke et al., "Image Change Detection Algorithms: A Systematic Survey", IEEE Transactions on Image Processing, vol. 14, No. 3. Mar. 1, 2005, pp. 294-307.

Sawhney et al., "Hybrid Stereo Camera: An IBR Approach for Synthesis of Very High Resolution Stereoscopic Image Sequences," Conference Proceedings on Computer Graphics (SIGGRAPH); 2001, Los Angeles, CA, Aug. 12-17, 2001, pp. 451-460.
Search Report Dated Apr. 5, 2011.

\* cited by examiner

METHOD AND APPARATUS FOR VIDEO OBJECT SEGMENTATION

CROSS-REFERENCE TO RELATED APPLICATIONS

This application claims the benefit, under 35 U.S.C. §365 of International Application PCT/US2011/000106, filed Jan. 20, 2011, which was published in accordance with PCT Article 21(2) on Jul. 28, 2011 in English and which claims the benefit of U.S. provisional patent application No. 61/336517, filed Jan. 22, 2010.

FIELD OF THE INVENTION

The present principles relate to an apparatus and method for efficient video object segmentation.

BACKGROUND OF THE INVENTION

Segmentation of moving objects in video sequences has many applications such as video surveillance, traffic monitoring, and object-based video coding. In some scenarios, the video background is static making segmentation easier than for those cases with moving backgrounds. Segmentation of objects with globally moving backgrounds poses a more complex problem than the static background case.

Many video segmentation methods attempt to identify foreground objects by subtracting the background in an image. In these cases, an accurate background model is needed to get reliable results. Some models estimate the background through a set of pixel values, using a running average, selective running average, or running Gaussian distribution. Median filtering of spatial pixels is also used to form a background model. Additionally, spatial correlations of pixel values are performed and consensus sample methods are used to generate stable background models. Performance for each of these types of methods varies with the content and becomes less reliable with globally moving backgrounds. Some existing segmentation techniques introduce artifacts and lose background detail.

Some compressed domain techniques are used for object segmentation, although some use just the dc value of a block and suffer from having block resolution. Another problem with compressed domain solutions is the difficulty of integrating their results with spatial domain imaging equipment.

SUMMARY OF THE INVENTION

These and other drawbacks and disadvantages of the prior art are addressed by the present principles, which are directed to a method and apparatus for video object segmentation. In one or more implementations, we describe a method that separates locally moving objects (foreground) in a video from a globally moving background using, for example, temporal and/or spatial contexts. The method computes and refines a foreground mask for each frame in four different stages involving frame alignment, pixel alignment, consensus filtering and spatio-temporal refinement. A foreground mask is a set of values indicating where in an image the foreground objects are located. When the foreground is indicated by one value, and the background is another value, it is called a binary foreground mask. Consensus filtering is a process to combine several sets of values into a single set. The described method introduces fewer artifacts and preserves more background details relative to existing methods.

Binary foreground masks generated using this method have been incorporated into a sampling-based super-resolution (SR) framework, which aims at boosting the compression efficiency of a conventional encoder. The system works by intelligently down-sampling the input frames in the pre-processing stage (i.e. prior to encoding) so that the high-resolution frames can be recovered during post-processing (i.e. after decoding) with the help of some transmitted meta-data, which includes the foreground masks. The super-resolution output generated using the segmentation method described herein has been found to have more background details and fewer artifacts compared to the output using other existing segmentation methods.

According to an aspect of the present principles, there is provided a method for video object segmentation. The method comprises the steps of aligning frames in the video sequence, generating an intermediate foreground mask, and refining the intermediate foreground mask using spatio-temporal information.

According to an aspect of the present principles, there is provided another method for video object segmentation. The method comprises the steps of aligning frames in the video sequence, generating initial foreground masks, consensus filtering the initial foreground masks to generate an intermediate mask, and refining the intermediate mask using spatio-temporal information.

According to another aspect of the present principles, there is provided an apparatus for video object segmentation. The apparatus is comprised of an aligner for aligning frames of the video sequence, means for generating an intermediate mask, and a processor that refines the intermediate mask using spatio-temporal information from the video sequence.

According to another aspect of the present principles, there is provided an apparatus for video object segmentation. The apparatus is comprised of an aligner for aligning frames of the video sequence, circuitry that generates initial foreground masks, a means for combining the initial foreground masks into an intermediate mask, and a processor that refines the intermediate mask using spatio-temporal information from the video sequence.

According to another aspect of the present principles, there is provided an apparatus for video object segmentation. The apparatus is comprised of an aligner for aligning frames of the video sequence, circuitry that generates initial foreground masks, a means for consensus filtering of the initial foreground masks into an intermediate mask, and a processor that refines the intermediate mask using spatio-temporal information from the video sequence.

These and other aspects, features and advantages of the present principles will become apparent from the following detailed description of exemplary embodiments, which is to be read in connection with the accompanying drawings.

DETAILED DESCRIPTION

The principles described herein are an apparatus and method for separating locally moving objects (foreground) in a video from a globally moving background using temporal and spatial contexts. The method is comprised of four stages (although additional implementations may vary the number of stages). First, for each current frame, the neighboring frames are transformed and aligned with the current frame to create a static background. Then multiple initial foreground masks are generated for the current frame using a pixel alignment metric with respect to each transformed neighboring frames that indicates the amount of shift in the reference frame. Areas of pixels that are dissimilar between the current frame and each aligned reference frame are noted as possible foreground objects. Next, in the consensus filtering stage, the information from the multiple masks is combined via a consensus mechanism to generate a single more accurate mask for the current frame. Finally, spatio-temporal information from the video sequence is used to refine the mask.

Figure 1:
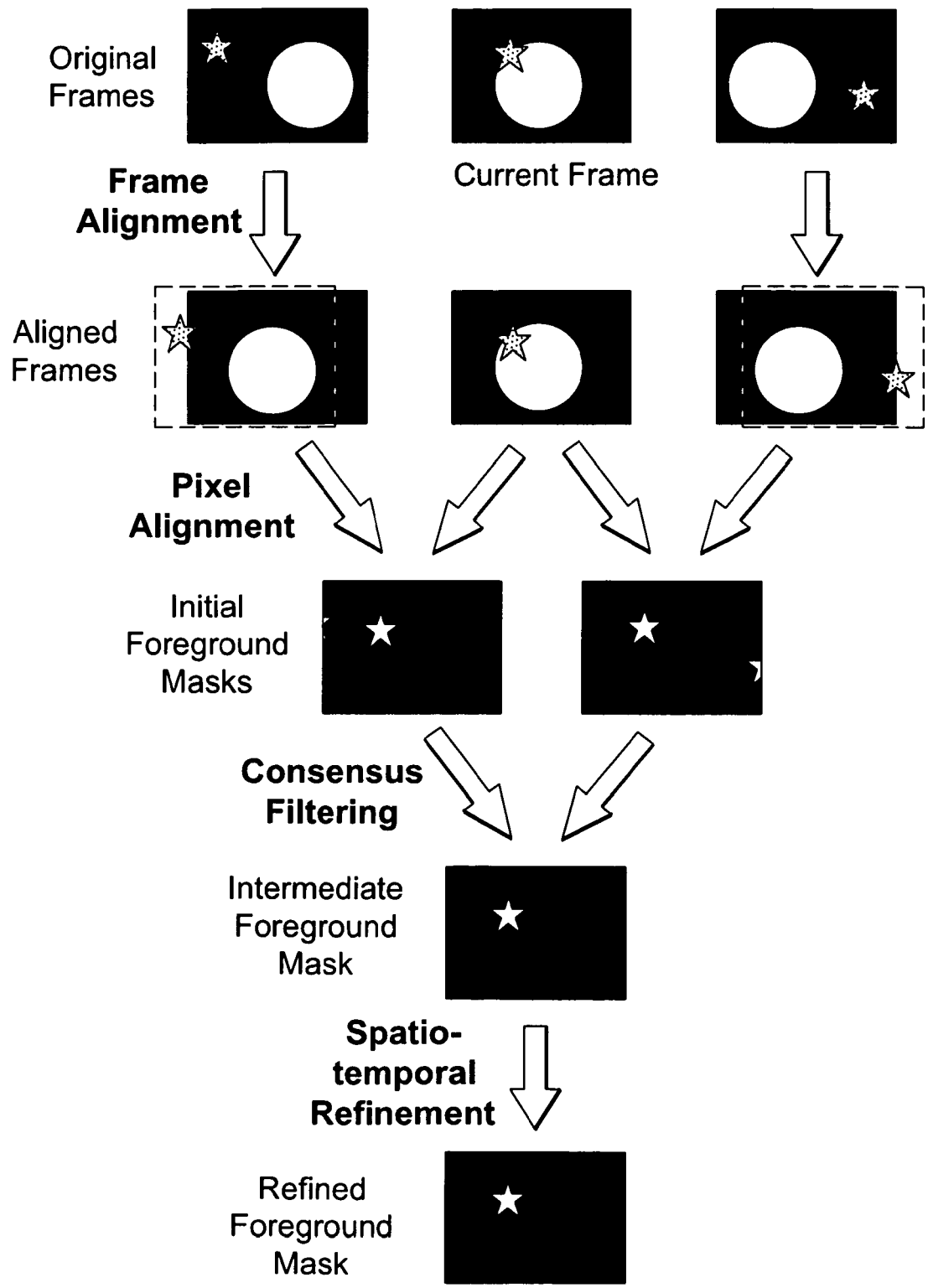
FIG. 1 shows an overview of an object segmentation example using the present principles.

Now we describe this motion-based object segmentation method that is proposed for one or more implementations, and provide some details on the implementation. The method can be viewed as having four stages: frame alignment, pixel alignment, consensus filtering, and spatio-temporal refinement. FIG. 1 gives an overview of the proposed method to extract the foreground (the star) from the current frame. The frame alignment stage transforms temporally neighboring frames (±1 frames for illustration purposes) to align with the coordinates of the current frame. Similarity between regions in the current frame and the aligned frame are initially presumed as background regions, and the pixel alignment stage generates initial foreground masks for the current frame with respect to each of the aligned frames, based on a neighborhood similarity measure. These masks are combined, for example, using a consensus filter process in the consensus filtering stage to obtain the intermediate foreground mask. Finally, in the spatio-temporal refinement stage, the accuracy of the mask is improved using information derived from the original video sequence.

In the example of FIG. 1, a current frame is shown at the top of the figure, along with its preceding and succeeding frames. The video contains a circular moon as part of a background, along with a star shape that is a foreground object. The frame alignment stage aligns the preceding and succeeding frames, so that the backgrounds appear stable. In this example, only one preceding frame and one succeeding frame are shown. The aligned frames are shown as a black background with a moon. The original frame positions are shown as dashed lines.

The pixel alignment stage generates initial foreground masks for each of the reference frames, in this case one preceding frame and one succeeding frame, relative to the current frame. This is done using a neighborhood similarity measure that examines dissimilar areas across the frames. Dissimilar areas between pixels of different frames are indicative of a foreground object. The pixel alignment stage in the example of FIG. 1 produces the two initial foreground masks shown in the third row of frames. They are comprised of one full star, and a partial star. The partial star in the first initial foreground mask results from the star in the preceding frame that is on the left side of the frame. The partial star in the second initial foreground mask is a result of the star on the right side of the succeeding frame of video.

In the next stage, consensus filtering of the initial foreground masks is performed. This process is used to determine which of the shapes in the initial foreground masks are actually foreground objects. The process considers all of the initial foreground masks that were generated in the pixel alignment stage and generates a single intermediate mask for the current frame. The intermediate mask is generated such that, for example, if a pixel position is determined to be part of a foreground object in 90% of the initial masks, than it will be declared as a foreground pixel in the intermediate mask. Likewise, if a pixel position is determined to be part of the background in, for example, more than 50% of the masks, it is a background pixel. In the example of FIG. 1, the partial stars in the initial foreground masks are eliminated and their positions are determined to be background, but the star in the center of the initial masks remains as a foreground object in the intermediate mask.

The spatio-temporal refinement stage uses information from the original frame to arbitrate those regions of the intermediate mask that are not distinctly declared as either a foreground or a background.

The four stages are now described in further detail.

The first stage in the video object segmentation process is frame alignment. It is possible to separate a moving object from a static background scene by examining dissimilar areas across several frames. However, in the presence of global motion, it is typically essential to compensate for the global motion by transforming and aligning the frames to emulate a static background. For modeling the global motion, an 8-parameter homography model is employed. Scale-invariant feature transform (SIFT) features and optical flow vectors are used to establish point correspondences. The parameters of the homography are estimated using a variant of the RANdom Sample And Consensus (RANSAC) algorithm to eliminate outliers.

A homography between two frames in the frame alignment stage may be computed directly or indirectly. Since a homography is a linear invertible transformation, the homography from frame A to frame B can be computed as a cascade of two homographies: A to C and C to B. For example, by computing homographies between each frame and the next, we may derive the homography between any two frames. We term this multi-hop homography computation.

For the homography computations in the frame alignment stage, a trade-off can be determined between two factors that influence the quality of transformations: distance between the frames used to compute the homographies and the maximum number of hops required to compute the transformation between any two frames.

The next stage in the process is the pixel alignment stage. The pixel alignment stage measures the similarity between the current frame and each of the aligned reference frames. The similarity is neighborhood-based, i.e. in order to determine if two pixels are similar, small neighborhoods around the pixels are examined. A modified normalized correlation metric may be used to determine if neighborhoods around the pixels are similar. If very similar, the two pixels are assigned a high similarity metric. This neighborhood-based metric makes the proposed method more robust to noise compared to some other median-filtering based methods which could be used. However, it also results in a slight loss of spatial precision which is remedied in the spatio-temporal refinement stage.

It is a difficult problem to extract a clean and reliable foreground mask from frames with independently moving regions. Errors in global motion estimation along with the noise in pixel values complicate the process. One implementation uses a sum of squared differences metric to determine if neighborhoods around the pixels are similar.

Other metrics may be used, however. Another method for extracting foreground masks $f_t$ is now described. The following are the steps in the process.

1. For frame $H_1$, the mask $F_1$ is filled with zeros. In other words, all pixels are considered as background.

2. To extract $F_t$, the transformed frame $H_t$ is compared with $H_{1t}$, i.e. $H_1$ transformed to the coordinates of $H_t$. A normalized correlation metric $N_{rt}(x)$ is computed between each pixel x in $H_t$ and the corresponding pixel in $H_{1t}$ considering a small neighborhood around the pixels. If there is no corresponding pixel in $H_{1t}$, (i.e. a pixel lies outside the boundaries of $H_1$) then $F_t(x)$ is set to 1. Otherwise, if $N_{rt}(x)$>T, where T is a chosen threshold, then $F_t(x)$=0. Otherwise, $F_t(x)$=1.

Other more robust methods including variations of the above may be used instead. For example, instead of simply using the normalized correlation metric, the motion alignment metric, which is an example of a modified normalized correlation metric, is discussed and explained in:

Sawhney, H.; Guo, Y.; Hanna, K.; Kumar, R.; Adkins, S.; and Zhou, S., "*Hybrid Stereo Camera: An IBR Approach for Synthesis of Very High Resolution Stereoscopic Image Sequences*," Proc. SIGGRAPH, pp. 451-460, 2001.

For each pair of pixels $P_1$, $P_2$ that need to be compared, the means $\mu_1$, $\mu_2$ and variances $\sigma_1^2$, $\sigma_2^2$ of N×N neighborhoods $I(P_1)$ and $I(P_2)$ around the pixels are computed. The normalized variances are computed as $\sigma_{Ni}^2=\sigma_i^2/(\mu_i^2+c)$ where i=1,2 is the index and c is a stabilizing constant to handle values close to zero. Then, the similarity metric A is computed using the pseudo-code given below.

```
if (σ₁² <= T1 && σ₂² <= T1) || (σ_N1² <= T2 && σ_N2² <= T2)
    if abs(μ₁ − μ₂) <= k*μ₁
        A = 1;
    else
        A = 0;
    end
else
    A = Σ((I(P₁) − μ₁)*(I(P₂) − μ₂)) / (N² * σ₁ * σ₂);
end
```

The similarity metric thus computed is compared to a threshold using a preset value to obtain an initial binary foreground mask.

In applications such as, but not limited to, super-resolution encoding, the foreground masks of certain frames (for example, the reference frames in super-resolution encoding) are more critical than those of other frames. Hence it would be better to incorporate a factor to account for the criticality of some frames in the mask generation method. The foreground masks for the important frames could be computed first and then during consensus filtering for remaining frames, information from the important frames could be incorporated. For example, fuzzy areas in non-reference frames that map to the inside of the foreground in the reference frame could be declared as background.

Also, better results are achievable in some applications when the declaration of the background pixels is very accurate. In the super-resolution encoding approach already mentioned, background pixels from non-reference frames get mapped to the reference frame during the super-resolution process. Therefore, methods that can help in determining that areas declared as background pixels are indeed background pixels can be employed. If we know which frame is the reference frame, we can fine tune the masks to satisfy such requirements.

In one implementation of the video segmentation method, soft thresholding that generates a non-binary result is done only during the consensus filtering stage, to be described next. However, in addition, the similarity metric can be soft thresholded in the pixel alignment stage to get an initial foreground mask with "fuzzy" regions. Soft thresholding is a technique that, besides comparing an input value to one or more threshold values, also weighs input values that are outside the threshold region, for example. In our case, regions where the similarity metric is ≤0.8 can be declared "definitely foreground", regions with similarity metric ≥0.9 can be declared "definitely background", and all other regions can be declared "fuzzy", for example.

Another option during the pixel alignment stage involves a, trade-off between foreground mask accuracy and computational complexity. This trade-off may be made by making foreground-background decisions block-wise (and not pixel-wise as is being done in the basic method described herein).

The next stage in the process is the consensus filtering stage. The initial foreground masks obtained in the pixel alignment stage identify the foreground, or the dissimilar region, for the current frame with respect to each of the temporally neighboring frames. These initial masks are combined in this stage by means of a consensus mechanism, an example of which is described below.

If a pixel position has been declared to be foreground in more than 90% of the initial masks, it is declared to be "definitely foreground". If a pixel position has been declared as background in more than 50% of the initial masks, it is declared to be "definitely background". Pixel positions that do not satisfy either criterion are declared "fuzzy" and their foreground/background states are arbitrated during spatio-temporal refinement. Thus, a 3-level intermediate mask is generated.

The threshold for declaring foreground is larger than that used for declaring background because some applications, such as super-resolution encoding, are more tolerant of background regions being erroneously declared as foreground than the reverse. These thresholds may thus be varied according to the application at hand.

If the threshold for declaring foreground is decreased or if the threshold for declaring background is increased, the foreground mask will be more complete (i.e. more foreground pixels will be identified as such). However, it has been found that values of around 90% and around 50% for the foreground and background thresholds give reasonable results.

The next stage in the process is the spatio-temporal refinement stage. In this stage, information derived from the original frame is used to refine the intermediate mask and arbitrate the fuzzy regions. First, there are sometimes areas in the foreground mask that correspond to flat regions, or regions with constant values, but containing motion in the original frame. These flat regions are filled using morphological operations. Morphological operations in image processing comprise processes such as erosion, dilation, opening, and closing, for example. These flat regions occur because it is difficult to detect motion in flat regions even when using a neighborhood-based similarity metric. Also, for a particular application such as super-resolution encoding, the output quality is not affected much if a flat region is erroneously flagged as foreground. In addition, filling these areas in flat regions using morphological operations makes the mask more complete and hence easier to compress. While filling these areas in flat regions, fuzzy regions are also considered as foreground.

Next, we refine the mask to make it spatio-temporally consistent. This process examines the pixels of a mask to ensure that the pixels make sense relative to the other pixels of the mask, and relative to those pixels in past and succeeding frames. For example, if only a few pixels have been declared to be foreground in a background region, then it is highly probable that those pixels are erroneous. Similarly if a pixel is declared to be foreground in one frame but background in the immediate past and future frames, then it is likely that the pixel is flagged wrongly.

Hence to ensure spatio-temporal consistency of the foreground mask, a three-dimensional (3D) neighborhood is examined around each pixel. For each pixel position, pixels within the 3D neighborhood that are similar (in color space) to the pixel in the original frame are considered. For example, we may examine the past two and succeeding two frames, and examine those pixels within 16 pixels horizontally and vertically of the pixel position. If more than 70%, for example, of the similar pixels are declared to be background and the current pixel is flagged as foreground, the current pixel's state is switched. Similarly, the current pixel's state is switched from background to foreground if more than 60%, for example, of the similar pixels are foreground. For pixels declared fuzzy, if more than around 50%, for example, of the similar pixels are foreground (or background), then the pixel is declared to be foreground (or background).

Finally, morphological operations with very small disc radii are used to further clean-up the mask. Such morphological operations are well known and include, typically, operations used to clean up an image, such as erosion, dilation, opening, and closing, for example. Such operations may also be able to remove noise having a size on the order of the very small disc radii.

The morphological operations done in the spatio-temporal refinement stage can be improved by using the percentage of ones in the initial foreground mask (after pixel alignment) in a neighborhood to determine the size of the disc used at that position.

Figure 2:
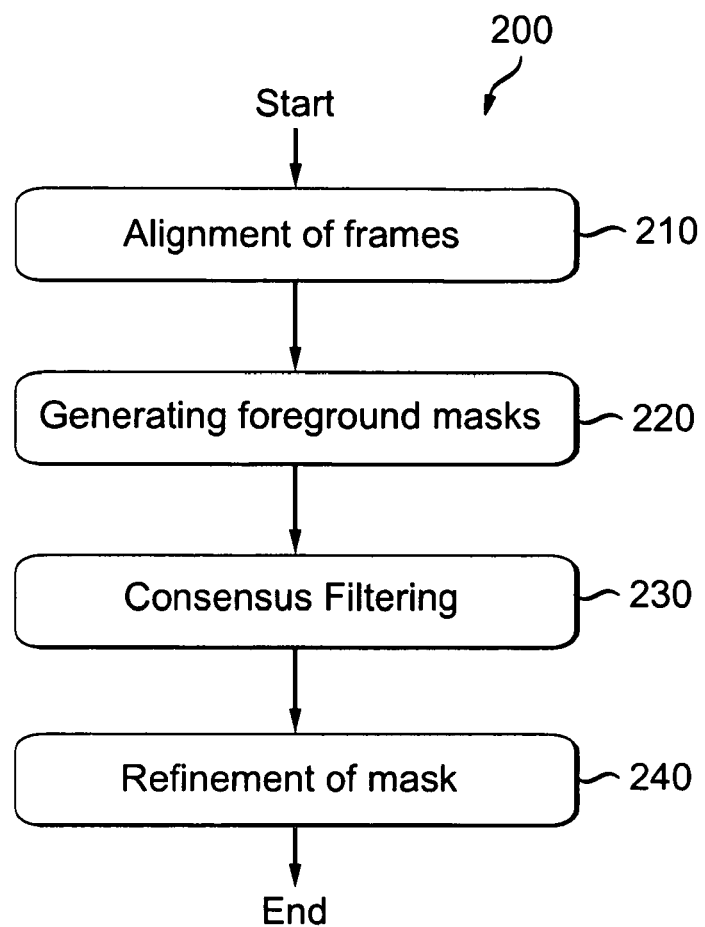
FIG. 2 shows a method for video object segmentation using the present principles.

One embodiment of the present principles is illustrated in FIG. 2, which shows a method for video object segmentation. Frames of the video sequence are transformed so that they are aligned to the current frame in step 210. This step is performed so that a stable background can be established for the pixel alignment stage. Initial foreground masks for the current frame with respect to the aligned frames based on a similarity measure is done in the pixel alignment stage in step 220. Dissimilar areas of the current frame relative to each reference frame are declared to be foreground objects in each initial foreground mask. These masks are combined using a consensus mechanism in step 230 to generate an intermediate foreground mask. One example consensus mechanism is to declare a pixel as a foreground pixel if that pixel is taken as a foreground object in around 90% of the initial foreground masks, and declare it a background pixel if it is determined to be a background pixel in more than around 50% of the masks. Refinement of the accuracy of the mask generated in step 230 is done by using information from the original frame, the video sequence, or masks in step 240. For example, if a pixel is declared as a foreground in 70% of the initial foreground masks, using the example thresholds above, it would neither be declared as a foreground or a background pixel by the consensus filtering mechanism. Therefore, the refinement in step 230 examines a horizontal and vertical range of pixels surrounding this pixel position, and examines a number of past and succeeding frames at this pixel position for information that will help in declaring the pixel either foreground or background.

Figure 3:
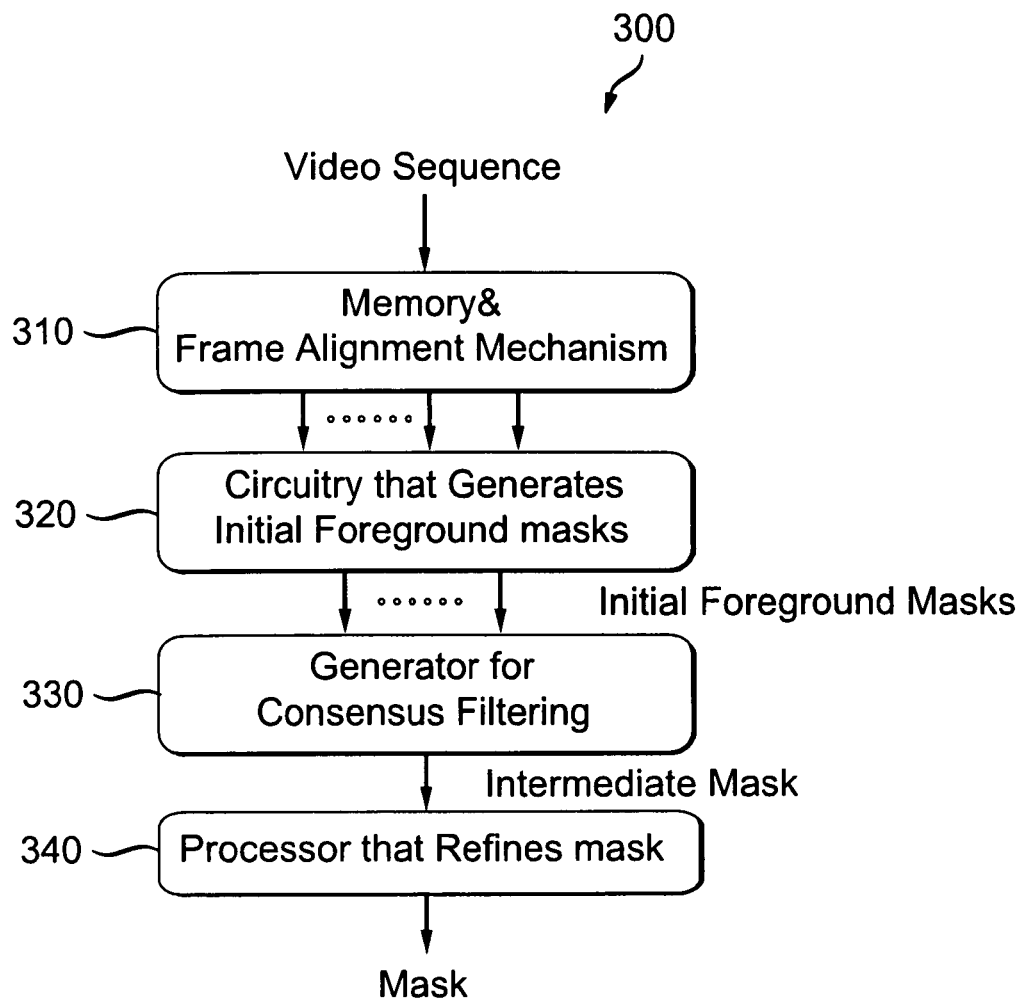
FIG. 3 shows an apparatus for video object segmentation using the present principles.

Another embodiment of the present principles is illustrated in FIG. 3, which shows an apparatus for video object segmentation. A video sequence is input to Memory and Frame Alignment Mechanism 310 so that at least one frame of the video sequence is stored and transformed to align with the current frame. The output of Memory and Frame Alignment Mechanism 310 is at least one reference frame and the current frame, which are in signal communication with the input of Circuitry that Generates Initial Foreground Masks 320 that generates foreground masks for each aligned reference frame relative to the current frame, based on a similarity measure. For example, pixels that are dissimilar between an aligned reference frame and the current frame are declared to be foreground objects in that particular initial foreground mask. The various outputs of circuit 320 representing each initial foreground mask are in signal communication with the input of Generator for Consensus Filtering 330 that performs consensus filtering on the various initial foreground masks to generate one intermediate foreground mask for the current frame. The output of Generator for Consensus Filtering 330 is in signal communication with the input of Processor that Refines Mask 340 that refines the intermediate mask based on information derived from a video frame, the original video sequence, or at least one mask. The output of Processor that Refines Mask 340 is the foreground mask.

One or more implementations have been described that use a motion-based object segmentation method that separates locally moving objects from a globally moving background. The implementations compute and refine a foreground mask for each frame in four different stages involving frame alignment, pixel alignment, consensus filtering and spatio-temporal refinement. The method and apparatus described introduces less artifacts and preserves more background detail than existing video object segmentation methods.

We thus provide one or more implementations having particular features and aspects. However, features and aspects of described implementations may also be adapted for other implementations.

For example, these implementations and features may be used in the context of coding video and/or coding other types of data. Additionally, these implementations and features may be used in the context of, or adapted for use in the context of, a standard. Several such standards are AVC, the extension of AVC for multi-view coding (MVC), the extension of AVC for scalable video coding (SVC), and the proposed MPEG/JVT standards for 3-D Video coding (3DV) and for High-Performance Video Coding (HVC), but other standards (existing or future) may be used. Of course, the implementations and features need not be used in a standard.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A description will now be given of the many attendant advantages and features of the present principles, some of which have been mentioned above. For example, one advantage of the present principles is that the foreground mask is refined using spatial and/or temporal information from the video sequence to make it more accurate and therefore video object segmentation is improved. This advantage is implemented in one embodiment of the present principles, which is a method for video object segmentation which comprises alignment of frames of the video sequence, generating initial foreground masks, generating an intermediate mask with consensus filtering, and refining the mask using spatio-temporal information from the video sequence.

Another advantage is an apparatus for video object segmentation, comprising an aligner for alignment of frames of the video sequence, circuitry that generates initial foreground masks, a generator that generates an intermediate foreground mask, and a processor that refines the mask using spatio-temporal information from the video sequence.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The invention claimed is:

1. An apparatus for video object segmentation, comprising:
   a memory and frame alignment mechanism that stores a plurality of frames of video and aligns one or more reference frames with a current frame containing a video object;
   circuitry that generates an intermediate mask for the current frame based on a neighborhood similarity metric; and
   a processor that refines the intermediate mask by using information from at least one video frame to generate a mask representative of the video object in the current frame;
   circuitry that generates initial foreground masks for a current frame with respect to each aligned reference frame based on a neighborhood similarity metric; and
   a generator that combines information from the initial foreground masks to generate an intermediate mask for the current frame before refining the intermediate foreground mask.

2. The apparatus of claim 1, wherein the processor uses information from at least one video frame that is some combination of spatial and temporal information.

3. The apparatus of claim 1, wherein the generator combines information using a consensus filtering mechanism.

4. The apparatus of claim 1, wherein said memory and frame alignment mechanism uses multi-hop homography between frames.

5. The apparatus of claim 1, wherein the circuitry that generates initial foreground masks generates masks on a block basis.

6. The apparatus of claim 1, wherein the circuitry that generates initial foreground masks generates them using a normalized correlation metric.

7. The apparatus of claim 1, wherein the circuitry that generates initial foreground masks generates them using weighting factors that weight individual frames.

8. The apparatus of claim 1, wherein the circuitry that generates initial foreground masks generates them using a three-level intermediate mask.

9. The apparatus of claim 1, wherein said processor uses morphological operations to combine information from the foreground masks to generate a single mask for the current frame.

* * * * *